United States Patent [19]

Vandervoort

[11] Patent Number: 4,640,145
[45] Date of Patent: Feb. 3, 1987

[54] MULTIPLE COUNTERSHAFT TRANSMISSION

[75] Inventor: John R. Vandervoort, Richland, Mich.

[73] Assignee: Eaton Corporation, Cleveland, Ohio

[21] Appl. No.: 289,007

[22] Filed: Jul. 31, 1981

[51] Int. Cl.[4] .............................................. F16H 3/08
[52] U.S. Cl. ........................................ 74/325; 74/331
[58] Field of Search ................. 74/325, 412, 331, 339, 74/357, 359, 360, 362, 363, 374, 443, 440

[56] References Cited

U.S. PATENT DOCUMENTS

| | | | |
|---|---|---|---|
| 3,105,395 | 10/1963 | Perkins | 74/745 |
| 3,237,472 | 3/1966 | Perkins et al. | 74/331 |
| 3,255,644 | 6/1966 | Warren et al. | 74/745 |
| 3,283,613 | 11/1966 | Perkins | 74/745 |
| 3,335,616 | 8/1967 | Perkins | 74/331 |
| 3,349,635 | 10/1967 | Richards | 74/331 |
| 3,378,214 | 4/1968 | Hilsinger | 242/107.7 |
| 3,500,695 | 3/1970 | Keiser | 74/331 |
| 3,648,546 | 3/1972 | McNamara et al. | 74/745 |
| 3,732,745 | 5/1973 | Jackson | 74/325 |
| 4,152,949 | 5/1979 | Vandervoort et al. | 74/331 |

*Primary Examiner*—James A. Leppink
*Assistant Examiner*—Frank H. McKenzie, Jr.
*Attorney, Agent, or Firm*—D. A. Rowe; H. D. Gordon

[57] ABSTRACT

An improved, multiple substantially identical countershaft assembly (16, 16A), change gear transmission (10) having at least two (20, 20A) countershafts is provided. The input gear (14) and each mainshaft gear (42, 44, 46, 48) is constantly engaged with a countershaft gear (24 and 24a, 26 and 26a, 28 and 28a, 30 and 30a, 32 and 32a) carried by each countershaft and all or substantially all of said input gear and mainshaft gears are provided with a number of gear teeth not evenly divisible by the number of countershafts whereby the level of noise generated by the meshing of the gear teeth is minimized.

11 Claims, 6 Drawing Figures

MULTIPLE COUNTERSHAFT TRANSMISSION

BACKGROUND OF THE INVENTION

1. Field of the Invention

This invention relates to change gear transmissions utilizing two or more substantially identical countershaft assemblies and more particularly relates to multiple countershaft transmissions having an improved gear structure which minimizes the occurences of simultaneous gear teeth engagements, or impacts of gear meshings, to reduce the level of gear noise generated thereby.

2. Background of the Invention

Change gear transmissions utilizing two or more substantially identical countershaft assemblies are well known in the prior art. Transmissions utilizing either simple or compound mainshafts in connection with multiple countershafts wherein the mainshaft, the mainshaft gears and/or the countershaft gears are mounted in a radially floating manner relative to the other gears are also well known in the prior art. Examples of such transmissions may be seen by reference to U.S. Pat. Nos. 3,105,395; 3,255,644; 3,283,613; 3,335,616; 3,349,635; 3,378,214; 3,500,695; 3,648,546; and 4,152,949, all of which are hereby incorporated by reference.

The prior art transmissions, particularly those transmissions utilizing a floating and/or pivoted mainshaft in connection with multiple substantially identical countershafts, have proven to be highly acceptable. However, as such transmissions utilize two or more countershaft gears constantly meshed with the drive or input gear and each mainshaft gear, the number of gear tooth meshings, and the noise generated thereby, is a multiple of the meshings associated with a comparable single countershaft transmission. As, for timing and indexing purposes, it is often preferable that multiple countershaft transmission countershaft gears be provided with an even number of teeth, and prior practice has been to utilize all, or substantially all, even number teeth mainshaft gears, the meshing of mainshaft gear teeth with the gear teeth on the associated countershaft gears occurred substantially, or substantially simultaneously, whereby the noise level generated thereby tended to be additive or reinforced. With the more recent emphasis on reduced noise transmissions, especially for heavy duty vehicles, this situation was not totally satisfactory.

SUMMARY OF THE INVENTION

In accordance with the present invention, the drawbacks of the prior art have been minimized or overcome to the extent that a relatively inexpensive and easily produced change gear transmission of the multiple substantially identical countershaft type which is quieter than comparable multiple countershaft transmittings heretofor available is provided. The improved transmission preferably utilizes a floating mainshaft and/or mainshaft gear structure in connection with substantially identical multiple countershafts.

The above is preferably accomplished by providing each of the substantially identical countershafts with countershaft gears having a number of teeth evenly divisible by the number of countershafts and utilizing mainshaft gears having a number of teeth not evenly divisible by the number of countershafts whereby the in-phase meshing (i.e. unison meshing impact) of the mainshaft gear teeth with the gear teeth of its associated countershaft gear is minimized.

Accordingly, it is an object of the present invention to provide a relatively inexpensive and easily produced improved change gear transmission of the multiple substantially identical countershaft type which is quieter than the heretofor available comparable transmissions.

This and other objects and advantages of the present invention will become apparent from a reading of the detailed description of the preferred embodiment taken in connection with the attached drawings.

DESCRIPTION OF THE PREFERRED EMBODIMENT

Figure 1:
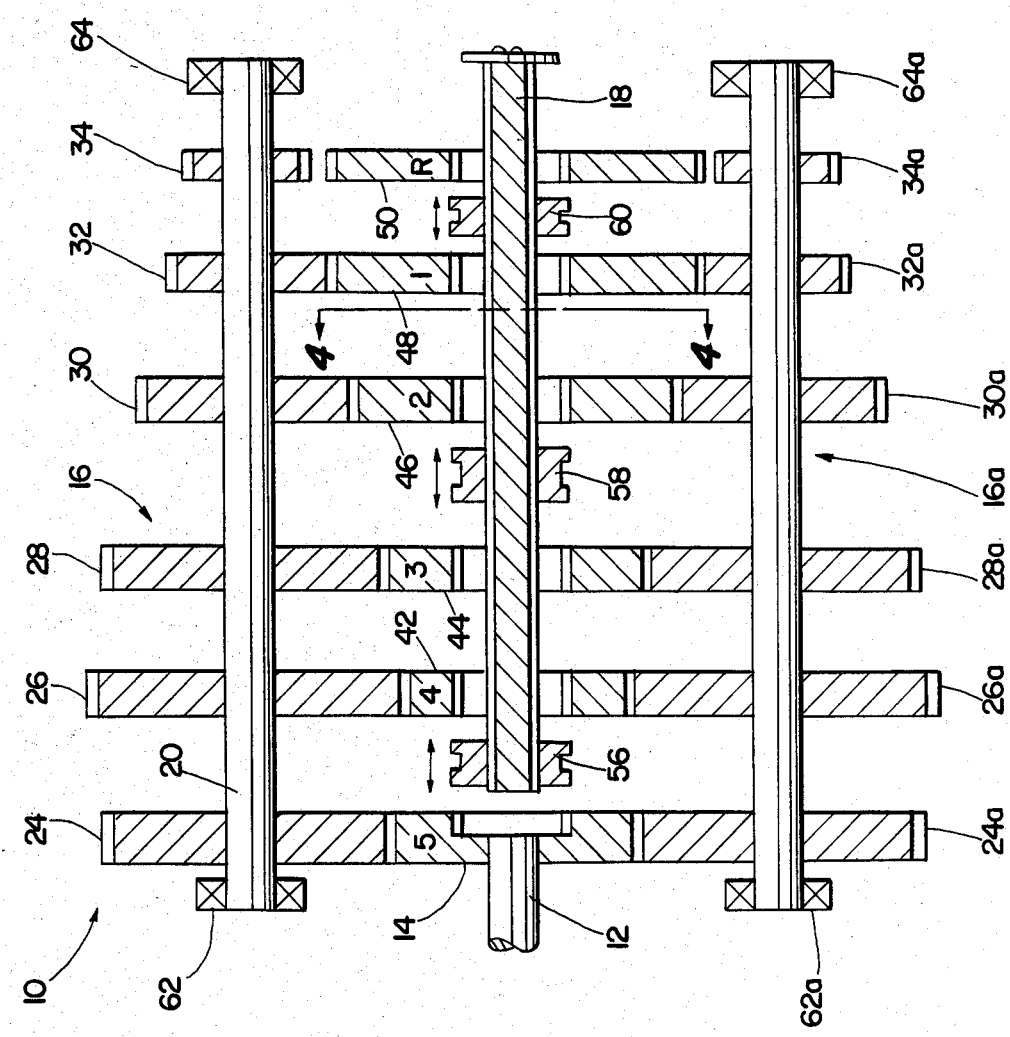
FIG. 1 is a schematic illustration of one embodiment of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives.

For convenience of identification, the shafts 12 have throughout been called the input shaft, and the shafts 18 have been called the mainshaft and output. This terminology has, however, been used for convenience in reference and is to be given no limiting significance inasmuch as the apparatus will operate with the direction of power flow reversed.

One embodiment of the transmission of the present invention may be seen by reference to FIG. 1. The transmission 10 schematically illustrated is of the twin countershaft type, it being understood, however, that multiple countershaft transmissions having three, four or more substantially identical countershafts may utilize the features of the present invention. Where two countershafts are used, the axes of the countershafts and the mainshaft will be substantially in the same plane. Where more than two countershafts are used, the same broad principle applies providing only that the countershafts are arranged substantially symmetrically about the axis of the mainshaft.

The transmission 10 comprises an input shaft 12 designed to be driven by the prime mover of the vehicle and carrying a drive or input gear 14 thereon. A pair of countershaft assemblies, 16 and 16A and a floating mainshaft 18 are provided. The axes of the mainshaft 18 and the countershafts, 20 and 20A, are substantially parallel. The axis of input shaft 12 is substantially concentric with the axis of mainshaft 18. The two countershaft assemblies, 16 and 16A, are substantially identical. Although the transmission 10 illustrated herein is a simple transmission, it is understood that the principles of the present invention are equally applicable to compound transmissions of the type comprising a main and an auxiliary section.

The countershafts 20 and 20A of the countershaft assemblies 16 and 16A, carry gears 24, 26, 28, 30, 32, 34 and 24A, 26A, 28A, 30A, 32A, 34A, respectively. Gears 42, 44, 46 and 48 encircle the mainshaft 18 and are constantly engaged with and supported by the countershaft gears 26, 26A, 28, 28A, 30, 30A, 32, 32A, respectively, as is well known in the art. Gear 50 surrounds the mainshaft 18 and is constantly engaged with and supported by a pair of reverse idler gears (not shown) which in turn mesh with gears 34 and 34A as is well known in the art. Axially slidable clutches 56, 58 and 60 are splined to the mainshaft for rotation therewith in a known manner. Clutch 56 may be selectively engaged to rotationally fix either the input shaft 12 (or input gear 14) or the gear 42 to the mainshaft. Clutch 58 may be selectively engaged to fix gear 44 or gear 46 to the mainshaft. Clutch 60 may be selectively engaged to fix gear 48 or gear 50 to the mainshaft.

Countershafts 20 and 20A are supported at their forward ends by bearings 62 and 62A, respectively, and at their rearward ends by bearings 64 and 64A, respectively.

The operation and structural features of the "floating" mainshaft, multiple countershaft type of transmission described above is well known in the prior art and a more detailed description thereof may be seen by reference to U.S. Pat. Nos. 3,105,395; 3,237,472; 3,335,616; and/or 3,500,695, all of which are assigned to the assignee of this invention and all of which are incorporated by reference. Although the preferred embodiment 10 of the present invention is illustrated as a floating mainshaft—floating mainshaft gear type of transmission, it is understood that the present invention is not limited to such structural features.

In operation, the input shaft 12 drives input gear 14 which is constantly engaged with gears 24 and 24A to drive the two countershaft assemblies 16 and 16A, the countershaft gears mounted thereon. The countershaft gears and reverse idlers are constantly engaged with the mainshaft gears and thus mainshaft gears 42, 44, 46, 48 and 50 are constantly rotating whenever the input shaft is rotating. The operator of the vehicle may, for example, move sliding clutch 60 to the right to rotationally couple gear 50 to the mainshaft to achieve a reverse rotation. Similarly, sliding clutch 60 may be moved to the left to couple gear 48 to the mainshaft 18 for operation in the first forward speed. Similarly, sliding clutch 58 may be utilized to engage gear 46 with the mainshaft for second speed or gear 44 with the mainshaft for third speed. Clutch 56 may be utilized to engage gear 42 with the mainshaft for fourth speed or to engage the input shaft 12 directly with the mainshaft 18 for fifth speed (direct drive) operation. Shift forks (not shown) of a standard design are provided for selective axial shifting of the clutches as is well known in the art.

Figure 2:
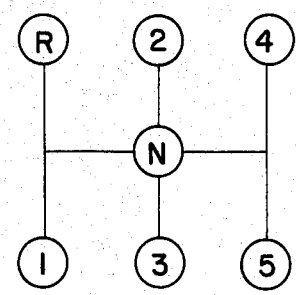
FIG. 2 is a schematic illustration of the shift pattern of the transmission of FIG. 1.

Reference to FIG. 2 will illustrate the three rail shift pattern followed by the operator.

In a multiple substantially identical countershaft transmission of the type illustrated, it is important that each of the gear groups, such as gear group 26, 42, 26A, have a specific relationship so that the countershaft assemblies can be assembled to the transmission, the mainshaft gear will tend to rotate about its axis and each of the countershaft gears will tend to share the torque load in a substantially equal manner. Obtaining this relationship is usually referred to as "timing" and "indexing" the transmission and in a twin countershaft transmission is usually accomplished by providing the input gear and mainshaft gears with an even number of teeth and providing substantially identical countershaft assemblies (i.e. countershaft and countershaft gears). The countershaft assemblies are assembled so that the countershaft gears on each countershaft are identically circumferentially aligned relative to the countershaft ("indexing"). This is usually accomplished by axially aligning one point (such as a gear tooth crest) with an axially extending location on the countershaft. It is noted that although the preferred embodiment 10 is illustrated as utilizing spur gears, the same principles, and the present invention, is equally applicable to multiple countershaft transmitting utilizing helical gearing.

The main shaft 18 also comprises the output unit of transmission 10. The mainshaft is arranged substantially coaxially with the input shaft 12 and is mounted for a degree of radial movement and/or floating movement relative to the countershaft assemblies 16 and 16A. Preferably, the forward end of the mainshaft is loosely received within a bushing (not shown) located in a recess in the rearward end of the input shaft or input gear and the rearward end of mainshaft 18 is pivotally supported by a bearing (not shown). Further details as to the mounting of the mainshaft may be seen by reference to U.S. Pat. No. 3,500,695. This type of a floating mounting of the mainshaft is for descriptive purposes only and is not intended to be limiting. Mainshaft gears 42, 44, 46, 48 and 50 encircle the mainshaft 18 for constant engagement with and support by the countershaft gears or idler gears as is well known in the prior art. Axially slidable clutch units 56, 58, 60 and 62 are utilized to selectively clutch the mainshaft gears, one at a time, to the mainshaft. Shift forks (not shown) are utilized to slide the clutches as is well known in the prior art. The gears 42, 44, 56, 58 and 60 may be collectively termed "mainshaft gears" since they are all capable of drivingly engaging the mainshaft. However, in the preferred embodiment illustrated, it is emphasized that they are all supported on and by the countershaft gears (or reverse idlers) and that they merely surround and at times engage the mainshaft but are not supported on or by the mainshaft. Rather, the mainshaft will move both rotatably and about the pivot axis with respect to those of the mainshaft gears with which it is not clutched at a particular moment.

Synchronizers and/or blocking rings can, if desired, be provided between the interengageable exterior clutch teeth associated with the various clutch units and the internal clutch teeth associated with the input gear and the various mainshaft gears.

Figure 3:
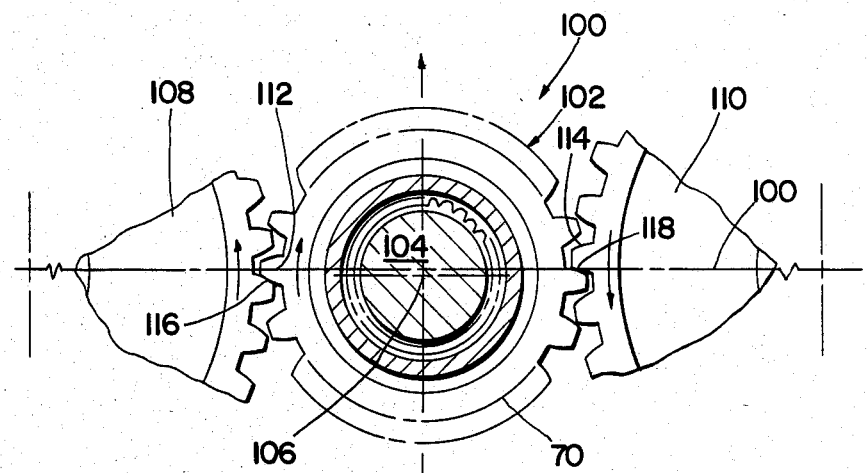
FIG. 3 is a typical fragmentary section of a prior art multiple countershaft transmission.

The meshing of the input gear and the mainshaft gears with the associated countershaft gears of a typical prior art multiple countershaft transmission 100 may be seen by reference to FIG. 3. In FIG. 3 a mainshaft gear 102 surrounding a mainshaft 104 is illustrated. The axis 106 of the mainshaft gear 102 and mainshaft 104 has floated, moved downwardly, in respect, to a plane 107 containing the axe of the countershaft gears 108, 110. Countershaft gears 108, 110 and the mainshaft gear 102 have an even number of teeth as is the established practice in the prior art. It is noted that even in this relatively displaced condition, the meshing of diametrically opposite teeth 112 and 114 on the mainshaft gear 102, see contact points 116 and 118, with the teeth on the countershaft gears is substantially in phase, that is, the initial impact and sliding contacts will occur at the same, or substantially the same, time.

Figure 5:
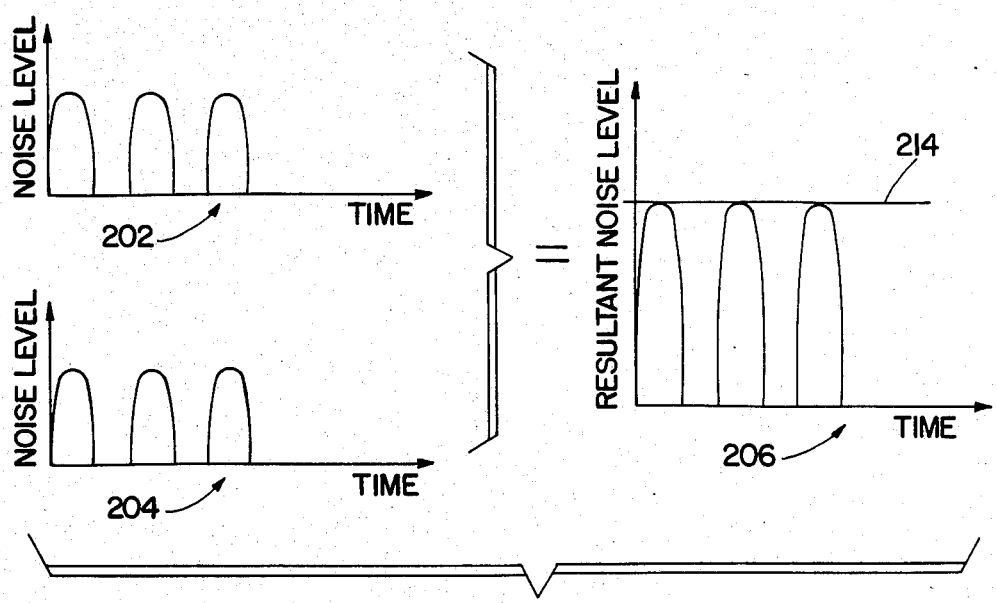
FIG. 5 is a graphical illustration of the theoretical noise impulses of a prior art transmission.

The resulting effect of such in phase simultaneous gear meshing on the level of gear mesh generated noise is graphically represented in FIG. 5. Graph 202 illustrates the noise generated, as a function of time, by the meshing impact and engagement of tooth 112 with its associated countershaft gear tooth while graph 204 illustrates the gear noise generated by the meshing impact and engagement of tooth 114 with its associated countershaft gear tooth. Graph 206 illustrates the resultant gear noise, as a function of time, generated by the in phase impact and engagement of teeth 112 and 114 with the associated countershaft gear teeth.

Figure 4:
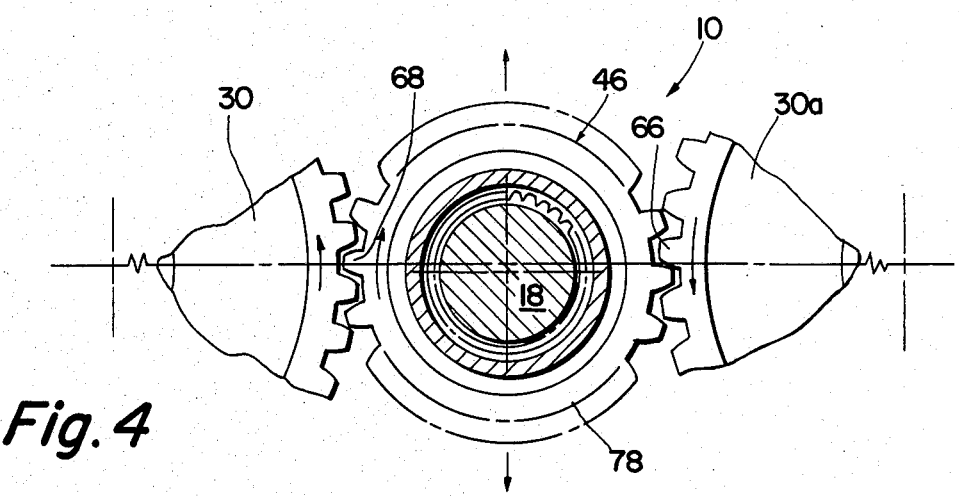
FIG. 4 is a typical fragmentary section of the improved transmission of FIG. 1 taken on line 4—4 of FIG. 1.

FIG. 4 is a partial cross sectional view (similar to FIG. 3) of the preferred embodiment 10 of the present invention taken along line 4—4 in FIG. 1. FIG. 4 illustrates, in exaggerated form for illustrative purposes, the meshing of mainshaft gear 46 with associated countershaft gears 30 and 30a. Mainshaft gear 46, and the remaining mainshaft gear 42, 44, 58 and 50, have an odd number of teeth. Countershaft gears 30 and 30a, and the remaining countershafts gears, 26, 26A, 28, 28A, 32, 32A have an even number of teeh for the reasons discussed above. As is shown in slightly exaggerated form, the meshing of tooth 66 on the righthand side of countershaft gear 46 is out of phase, by approximately one half pitch, with the meshing of teeth 68 on the lefthand side of gear 46.

Figure 6:
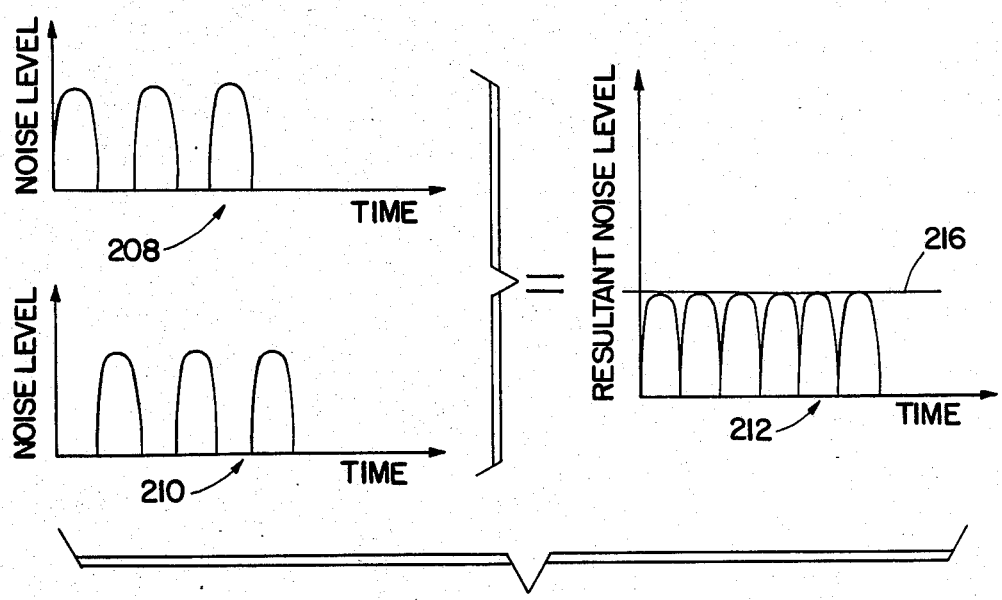
FIG. 6 is a graphical illustration of the theoretical noise impulses of the transmission of the present invention.

The effect of such out of phase meshing on the level of gear noise generated is graphically illustrated in FIG. 6. Graph 208 illustrates the noise generated, as a function of time, of the meshing impact and engagement of the mainshaft 46 gear teeth with the countershaft gear 30 gear teeth. Graph 210 illustrates the noise generated, as a function of time, by the meshing impact and engagement of the mainshaft gear 46 gear teeth with the countershaft gear 30A gear teeth. Graph 212 illustrates the resultant gear noise generated by the phased, or non-simultaneous, impact and engagement of the mainshaft gear 46 gear teeth meshing with the gear teeth of the associated countershaft gears, 30 and 30A.

It may be seen that the theorectical level 214 of noise generated in the prior art twin countershaft transmission 100 is considerably greater than the theorectical level 216 of noise generated in the improved transmission 10 of the present invention.

It has been observed that this effect is especially advantageous for floating mainshaft and/or floating mainshaft gear types of multiple countershaft transmissions as the ability of the mainshaft and/or mainshaft gears to float results in a substantially equal loading on each countershaft gear and also tends to result in very closely phased gear meshings if the prior art gear structure is utilized.

While the sectional view of FIG. 4, and the graphic illustrations of FIG. 6, illustrate an absolutely optimal situation wherein the gear meshing of the mainshaft gear with its associated countershaft gears is exactly one-half pitch apart, similar, but somewhat smaller, reductions in resultant generated noise level may be achieved with other out of phase gear meshing structures. Additionally, the use of a gear structure to achieve an out of phase gear meshing will tend to result in only random harmonic frequencies being established (i.e. so called "white noise") rather than patterned harmonic frequencies.

To achieve a similar result for multiple countershaft transmissions utilizing three or more substantially identical countershaft assemblies, the mainshaft gears should have a number of teeth not evenly divisible by the number of countershaft assemblies. That is:

M is not equal to XN where;

M = number of mainshaft gear teeth,

X = a whole number (integer),

N is greater than or equal to 2, and

N = number of countershaft assemblies.

To achieve the optimal minimization of simultaneous gear meshing, if N is an even number, M will be an odd number. Thus, for example, in a four countershaft transmission, theoretically, an eighteen tooth mainshaft gear will generate a lower level of noise than a sixteen or twenty tooth mainshaft gear, but a seventeen or nineteen tooth mainshaft gear will generate a lower level of noise than an eighteen tooth mainshaft gear.

Although this invention has been described in its preferred form with a certain degree of particularly, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. An improved change gear transmission of the type comprising an input shaft having an input gear thereon, a mainshaft, at least two substantially identical countershafts equally circumferentially spaced about said mainshaft and driven by said input gear, said countershafts having an axis of rotation substantially parallel to the axis of rotation of said mainshaft, each of said countershafts having a plurality of countershaft gears supported thereon for rotation therewith, a plurality of mainshaft gears surrounding said mainshaft and constantly meshed with one countershaft gear on each countershaft and clutch means for selectively clutching said mainshaft gears one at a time to said mainshaft, the improvement comprising:

said input gear and each of said mainshaft gears have a number of gear teeth defined by the relationship:

M is not equal to XN wherein;

M = number of gear teeth on said input gear and said mainshaft gears,

X = a whole integer, and

N = the number of substantially identical countershafts.

2. The improved transmission of claim 1, wherein said mainshaft is radially movable relative to the axes of said countershafts and said mainshaft gears are radially movable relative to said mainshaft and supported by the countershaft gears meshed therewith.

3. The improved transmission of claim 2, wherein said mainshaft and countershaft gears are spur gears.

4. The improved transmission of claims 1, 2 or 3, wherein if N is an even number, M is an odd number.

5. An improved change gear transmission of the type comprising an input shaft having an input gear thereon, a mainshaft, two substantially identical countershafts driven by said input gear, said countershafts having an axis of rotation substantially parallel to the axis of rotation of said mainshaft, the axes of rotation of said mainshaft and said countershafts lying substantially on a single plane, each of said countershafts having a plurality of countershaft gears supported thereon for rotation therewith, each of said countershaft gears having an even number of gear teeth, a plurality of mainshaft gears surrounding said mainshaft and constantly meshed with one countershaft gear on each countershaft and clutch means for selectively clutching said mainshaft gears one at a time to said mainshaft, the improvement comprising:

said input gear and each of said mainshaft gears having an odd number of teeth.

6. The improved transmission of claim 5, wherein said mainshaft is radially movable relative to the axes of said countershafts and said mainshaft gears are radially movable relative to said mainshaft and supported by the countershaft gears meshed therewith.

7. The improved transmission of claim 6 wherein said mainshaft and countershaft gears are spur gears.

8. An improved change gear transmission of the type comprising an input shaft having an input gear thereon, a mainshaft, at least two substantially identical countershafts equally circumferentially spaced about said mainshaft and driven by said input gear, said countershafts having an axis of rotation substantially parallel to the axis of rotation of said mainshaft, each of said countershafts having a plurality of countershaft gears supported thereon for rotation therewith, a plurality of mainshaft gears surrounding said mainshaft and constantly meshed with one countershaft gear on each countershaft and clutch means for selectively clutching said mainshaft gears one at a time to said mainshaft, said mainshaft gears supported by the countershaft gears meshed therewith, said mainshaft radially movable relative to said countershafts and said mainshaft gears radially movable relative to said mainshaft, the improvement comprising:

a plurality of said mainshaft gears and said input gear have a number of gear teeth defined by the relationship:

M is not equal to XN
  wherein;
  M = number of gear teeth on said input gear and said mainshaft gears,
  X = a whole integer, and
  N = the number of substantially identical countershafts.

9. The improved transmission of claim 8, wherein if N is an even number, M is an odd number.

10. The improved transmission of claim 1 wherein each of said countershaft gears have a number of gear teeth defined by the relationship:

$$C = XN$$

wherein C = number of gear teeth on said countershaft gears.

11. The improved transmission of claim 8 wherein each of said countershaft gears have a number of gear teeth defined by the relationship:

$$C = XN$$

wherein C = number of gear teeth on said countershaft gears.

* * * * *